United States Patent
Bagashev et al.

(10) Patent No.: US 6,986,019 B1
(45) Date of Patent: Jan. 10, 2006

(54) METHOD AND APPARATUS FOR DETECTION AND MANAGEMENT OF DATA STREAMS

(75) Inventors: Yuri Bagashev, Sunnyvale, CA (US); Jean-Pierre Ruster, Mountain View, CA (US); Maurice Schlumberger, Menlo Park, CA (US)

(73) Assignee: Maxtor Corporation, Longmont, CO (US)

( * ) Notice: Subject to any disclaimer, the term of this patent is extended or adjusted under 35 U.S.C. 154(b) by 240 days.

(21) Appl. No.: 10/419,402

(22) Filed: Apr. 21, 2003

(51) Int. Cl.
*G06F 12/06* (2006.01)

(52) U.S. Cl. .................................................. 711/217

(58) Field of Classification Search ................ 711/113, 711/137, 213, 217
See application file for complete search history.

(56) References Cited

U.S. PATENT DOCUMENTS

| | | | |
|---|---|---|---|
| 5,371,870 A | 12/1994 | Goodwin et al. | 395/425 |
| 5,442,747 A | 8/1995 | Chan et al. | 395/164 |
| 5,490,113 A | 2/1996 | Tatosian et al. | 365/189.05 |
| 5,627,994 A | 5/1997 | Levy et al. | 395/477 |
| 5,915,260 A | 6/1999 | Sokolov | 711/113 |
| 6,038,619 A | 3/2000 | Berning et al. | 710/33 |
| 6,070,230 A | 5/2000 | Capps | 711/137 |
| 6,092,149 A | 7/2000 | Hicken et al. | 711/113 |
| 6,092,154 A | 7/2000 | Curtis et al. | 711/137 |
| 6,138,221 A | 10/2000 | Korst et al. | 711/167 |
| 6,253,289 B1 | 6/2001 | Bates, Jr. et al. | 711/137 |
| 6,378,036 B2 | 4/2002 | Lerman et al. | 711/112 |
| 6,427,184 B1 | 7/2002 | Kaneko et al. | 711/4 |
| 6,463,508 B1 | 10/2002 | Wolf et al. | 711/133 |

*Primary Examiner*—Kevin L. Ellis
(74) *Attorney, Agent, or Firm*—David M. Sigmond

(57) ABSTRACT

A system for the detection and support of data streams is disclosed. The system determines whether new commands comprise a data stream. If a new data stream is detected, the system next determines whether adequate resources are available to launch the new data stream. If the system determines that the data stream can be launched, system resources, particularly cache memory space, are assigned to the data stream to provide the data stream with the necessary amount of data throughput needed to support the data stream efficiently. The data stream's throughput is the amount of data that the stream requires per unit time. The system monitors all supported data streams to determine when a particular data stream has terminated, at which time resources dedicated to the data stream are released and become available to support other data streams. The cache for each supported data stream is maintained at as full a level as possible, with the cache for the "least full" data stream given priority for refresh. Allocating resources by throughput allows for more efficient resource utilization.

61 Claims, 4 Drawing Sheets

METHOD AND APPARATUS FOR DETECTION AND MANAGEMENT OF DATA STREAMS

This disclosure is related to the "System and Method for Caching Data Streams on a Storage Media" patent application by Jean-Pierre Ruster and Maurice Schlumberger, U.S. Ser. No. 09/877,263 filed on 8 Jun. 2001. That application is incorporated herein for all purposes.

BACKGROUND OF THE INVENTION

This invention is in the field of digital data storage and retrieval. It relates more specifically to the storage and retrieval of large files of digital data that are typically either stored or retrieved as a continuous, uninterrupted stream.

It has become common to store music and movies as digital files. Digital film files in particular are typically larger than the digital files of other types of data. They also tend to be stored and retrieved in a particular manner. Digital music and video files are typically either retrieved or stored from start to finish as a continuous data stream. Although it is possible to stop the video or music at any time, it is more likely that the user will play an entire film or piece of music from start to finish. Even in the cases when the film or music is interrupted, large blocks of the digital files will be either stored or retrieved without interruption. For this reason, these files most often act as data streams and will discussed in this application as such. To recall and display or play either a digital film or digital song, the digital data must reach the system that will process it in a nearly continuous fashion, to prevent interruptions in its display or performance and to permit the most efficient storage of the digital file.

There are at least several other areas that generate digital data files that can be treated as data streams. These include medicine, including test results from Magnetic Resonance Imagery (MRI) or Computed Axial Tomography (CAT) scans, high-energy particle physics, satellite reconnaissance and other types of remote sensing. This list is not intended to be exhaustive. The techniques and apparatus described herein can be used to improve the management of any digital data file that comprises a large amount of digital data that is usually accessed and manipulated sequentially as a whole.

For purposes of this specification, the digital file of a film, song, picture or other data (see the preceding paragraph) is called herein a data stream. Although streaming data has so far been used to describe video and audio digital data, any sufficiently large file of digital data, including pictures, text and the like, may act like and require the same treatment as a data stream.

As data streams have become more and more common, computer systems are increasingly expected to adequately service such data streams. Such service will typically consist of properly supporting the data stream while responding with reasonable speed to a series of asynchronous, essentially random data accesses. In the near future, computer systems will probably be required to handle multiple data streams simultaneously. Although retrieving and processing a single data stream corresponding to a single video places large demands on the storage and retrieval devices of whatever system is assigned to this task, most current computer systems handle a single data stream and some amount of asynchronous random data requests reasonably well. However, retrieving and displaying or storing multiple data streams simultaneously is extremely resource intensive. Known systems typically do not handle multiple data streams well.

The most common mass storage medium in a computer system is a hard disk drive. As hard disk drives are known in the art, only those aspects of their construction and operation that are particularly relevant to the present invention will be discussed here.

A hard disk drive typically comprises a spindle motor and one or more disk coated with magnetic material, the disks being attached to the spindle motor and rotated by it. The disks typically have a plurality of concentric recording tracks. A plurality of transducers, usually one per usable disk surface, for reading and recording data on the disks are attached to a series of transducer arms which position the transducers over the specified track of the disks. In turn, the transducer arms are attached to a servomechanism that radially positions the transducer arms. A buffered data path is then provided for transferring data between the transducers and the disk interface. Finally, the separate elements are all under the control of one or more sequencers or microprocessors which electrically couple and control the spindle motor, the transducers, the servo mechanism and other related systems, including an error correction code system. At least one disk surface has positioning signals thereon, which signals provide the servomechanism with location reference information allowing for the proper positioning of the transducers arms.

In terms of data processing, the typical disk drive comprises a cyclical, multi-tracked storage medium for digital data which, in response to external read and write requests, either establishes a buffered path to and copies data from at least one logical block address (LBA) location on the multi-tracked storage medium identified by each read request or establishes a buffered path to and records data to at least one LBA location on the multi-tracked storage medium identified by the write request. It is possible to arrange storage on the disk(s) as one or more continuous spiral tracks beginning at the maximum outer diameter of the disk that the transducer can reach and extending to the minimum inner diameter of the disk and interlaced as necessary. This is not typically how data is stored on disks today, but could be utilized in a data stream environment. The present invention description can operate equally well with either arrangement of data tracks on disks.

Proper control of the buffers between the disk drive's transducers and the disk drive's interface with the computing environment it is coupled to is essential to insure smooth transfer of data to and from the disk drive.

In the case of data streams, proper allocation of the disk drive's buffers (also called "caches" herein) and proper operation of its microprocessor controls are needed to effectively support a single data stream and multiple asynchronous random accesses or multiple data streams simultaneously or some combination of both. Although most disk drives support a single data stream reasonably well, even with some level of random accesses, multiple data streams are managed much less successfully. Most disk drives do not or cannot recognize data streams mixed with other data types and, as a result, their relatively low transfer rates and inefficient internal resource allocation makes them poor data stream managers.

Known caching schemes do not make specific efforts to support data streams beyond sequential storage access, both in terms of Logical Block Addresses (LBAs) and access time. Once a data stream has begun (this cannot accurately be described as "requested" as operating systems do not typically address the problems of data streams), it may or may not be properly serviced, the servicing depending on the size of the cache allocated to sequential data and the actual address sequences of the accesses. As no specific effort is made to identify whether a set of commands (which will not necessarily be a linear sequence of LBAs) references a data stream, no effort is or can be made to service one or more such data streams as data streams. The most commonly used computer operating systems currently service only one data stream properly.

Certain storage systems which use queues, including SCSI disc drives, recognize that a series of input/output (I/O) requests can be bundled together, possibly re-ordered and then sent to the disk drive as a single request. This approach does not address the need to front load the drive's read cache to insure that all I/Os are within the cache and eliminate the need to wait for a physical disk drive I/O, or the need to free the write cache in advance of an end user request, both of which are minimal requirements to support one or more data streams adequately.

Most storage systems, including disk drives, simply use a large cache and assume that this will be adequate to support data streams. Unfortunately, when multiple data streams and random commands mix or if there are disk problems, the data streams are typically not serviced adequately. In those cases where a data stream is actually recognized, management of multiple data streams in the data storage system is usually handled in one of two ways. Either the data streams are serviced in a round robin manner, where each data stream is serviced in turn, or a data stream gets priority service when the system determines that there is insufficient data "on hand" to support the continuation of the stream safely. In this context, servicing means that data is either read from the disk and placed into the buffer to support the data stream or data is placed in the buffer preparatory to being written to the disk. Neither the round robin nor "starvation" support scheme allows proper servicing of multiple data streams.

A round-robin approach, where each data stream is serviced in turn, fails when the data streams have different throughputs, as can occur at either the storage level, where the disk drive handles some data streams faster than others (one data stream is accessing data from the drive's inner diameter and another data stream is accessing data from the drive's outer diameter), or at the user level, where one user is accessing both an MP3 data stream and an MPEG2 data stream at the same time. The determination of which data stream needs to be serviced next cannot be static, but must be adjusted dynamically. The round-robin approach is a static one, and usually results in one or more data streams losing support.

Further, the round-robin support scheme is extremely wasteful in that the disk drive's transducers are moved across the disk to access different sectors too often while servicing the different data streams. The time lost in moving the transducers can lead to a condition called herein "thrashing," where data streams begin to starve for data while the system moves the transducers to different disk areas to service each data stream successively. The failure of the round-robin support scheme stems from the failure to recognize that different data streams require different amounts of support in any given time interval.

The "starvation" scheme can also lead to thrashing for similar reasons. The starvation method of support scheduling, also known as "deadline scheduling," focuses on scheduling support for processes (data streams in the present invention) when they have reached a trip-level or deadline and ignoring them otherwise. This approach, with some added complexities, has been the mainstay of operating system scheduling since the 1960s. When applied to data streams, this method would assign attention to a given data stream when its remaining buffered time drops below a certain level. Various levels would require different levels of attention.

Unfortunately this approach in practice keeps the global system as close to collapse as possible, only acting when an action is required instead of acting when an action is possible. A system using this approach must be carefully tuned for the specific set of applications it runs, or overdesigned to support any possible set of applications, or the least delay in data retrieval will cause its collapse.

Proper data stream management further requires that the difference between random and data stream cache access patterns be recognized. In a random series of commands, data stored in the cache may be reused. In a data stream, it is very unlikely that data will be reused. Therefore, there must be a different replacement algorithm for the sequential (data stream) and random access portions of the cache.

Some known disk drives, when the drive controller determines that the current command is a sequential read, "post fetch" data, usually up to the end of the current disk track. "Post fetch" is useful as it is based on the known statistical likelihood that the "post fetched" data will be needed. "Post fetch" remains a method for improving response to a single data stream. It does not provide a successful method for dealing with multiple data streams. Other known disk drives have used different cache storage methods for sequential and random data.

Despite the recognition by some storage device manufacturers that sequential data streams need to be handled very differently from random data so as not to flood or starve the random cache, little has been done to solve the problems associated with cache starvation or flooding, which servicing multiple data streams can occasion. At best, known methods manage random accesses, some of which happen to be spatially sequential.

U.S. Pat. No. 6,038,619 recognizes a single data stream that comprises either purely sequential or near sequential read or write requests. This recognition permits using a circularly buffered data path to support the data stream. The '619 patent recognizes only a small subset of the command sequences that can be data streams, it does not recognize the need or possibility of supporting multiple data streams at the same time, makes no provision for considering the throughput needs of a data stream and does not consider how to detect the end of a data stream.

Further complications arise when the data storage system must deal with multiple data streams at the same time, or when the system must deal with both random accesses and data streams at the same time. In these cases, the system will typically stop recognizing the data stream as a sequential data stream and cease post-fetching it. This dramatically reduces the data throughput available to support the data stream. Even with a single data stream, if the stream commands do not come in synchronously, the drive will halt its post-fetch at some point, which eventually results in a delay in the data transfer as the drive waits for needed data to pass again under its read-write transducers. Similarly, when the cache fills up, no further "post-fetching" is attempted, as there would be no place to store the fetched data. However, by ceasing to "post-fetch," the system has essentially stopped recognizing the data streams, eliminating whatever improved data stream handling had been achieved.

Known data stream management systems and methods also fail when data streams end. No known system or method actively attempts to detect the end of a data stream. At best, the controller in a disk drive might detect that commands are no longer in approximate LBA order. This detection does not occasion any formal procedure to terminate support of the data stream.

Without recognizing that individual data streams may require variable amounts of data over time and that different data streams have different data requirements over the same time period, there cannot be any effective means for managing multiple data streams either alone or in combination with random accesses. This awareness of data stream throughput requirements is missing from any known system or method of data stream management.

For example, if one loads four large images or files, today it is better to request the loading of these files one after the other, rather than requesting them all simultaneously. The time difference between these two approaches is significant, the delay associated with simultaneous loading being caused by thrashing between the four data streams.

With more typical data streams, including audio and video files, where uninterrupted throughput is essential, as stream data must be delivered on time, not late, similar problems arise if simultaneous, rather than sequential access is requested. A computer operating system cannot be relied upon to deliver commands sequentially in these cases. Delivering uninterrupted support for data streams in these environments thus becomes virtually impossible with known systems and methods.

A method and system for supporting multiple data streams simultaneously would represent a significant improvement over the known art.

SUMMARY OF THE INVENTION

The present invention, in a first embodiment, comprises a method and system for recognizing the start of, supporting and terminating at least one data stream as that data stream is either sent to a display system from a mass storage device or sent to the mass storage device from a source of digital data. These methods of detecting the beginning of a data stream, supporting the data stream and terminating the data streams are based on the realization that a data stream must be supported based on its throughput, defined herein as the amount of data that the data stream requires per predefined unit of time. The present invention uses this concept of throughput at every step of its operation: in determining whether sufficient system resources are available to accept and launch a data stream; in supporting each data stream that has been launched; and in deciding when a data stream has been terminated.

Data Stream Detection

The present invention monitors and tracks recent commands and continuously checks to determine whether the most recent command, when combined with previously tracked commands now indicates that the new command and the previously tracked commands together comprise a data stream. The present invention first determines if the new command belongs to an already launched and supported data stream or whether the new command is part of an already existing pre-stream, which is defined as a potential data stream that has not yet met all the criteria to be a recognized data stream.

Data Stream Launch

Once the present invention has identified a new data stream, storage transfer resources, including cache space, are analyzed to determine if a new data stream can be launched. No new data stream can be added to the list of supported data streams until the system determines that there are sufficient resources to support the new data stream properly. This determination is particularly important herein, as the launch of a new data stream is extremely demanding of system resources.

To launch a data stream, the system first determines whether there is enough available cache space to store sufficient data to support the new data stream for at least a predetermined length of time. For example only, the system may require that at least two (2) seconds of data for the new data stream be stored. It bears emphasizing that the amount of data required to fulfill this minimum varies from one data stream to the next. It even varies over time for the individual data stream. The present invention thus continually re-evaluates the individual data streams to determine their throughput.

Having determined the throughput of the new data stream, the system next checks to determine if each of the currently supported data streams has sufficient cached data to support them for the period of time it will take to launch the new data stream and some increment above this, as it will take time to again retrieve data for the currently supported data streams. Only if these caches are adequately full will the system launch a new data stream.

Data Stream Support

After launch, the new data stream and existing data streams must be supported. The present invention continues to retrieve and cache data for each data stream, trying always to retrieve enough data to support each data stream for at least a predefined period of time. The amount of data retrieved will vary for each data stream. The present invention attempts to fill each stream's cache as full as possible with each data retrieval, and the present invention always retrieves at least the predefined minimum. Exceeding the minimum retrieval is desirable, if other requirements can still be met. By retrieving and storing data based on the throughput of the individual data streams, and by attempting to keep each data stream's cache at least full enough to support the stream for a predetermined time period, the present invention minimizes transducer moves within the storage device (herein typically a hard disk drive). When the transducers are moved too often, less data is transferred in any given time period and data stream caches can be exhausted, leading to thrashing as the system moves the transducers ever more often, trying to service each data stream, but ultimately failing.

Data Stream Termination

In order to optimize use of limited system resources, the present invention also detects the end of a data stream. By tracking each supported data stream's instantaneous throughput, the present invention can determine that a data stream has stopped. Once a data stream terminates, resources that were allocated to its support are available either to support other existing data streams or to support newly detected data streams.

The present invention at least doubles the number of concurrent data streams that a given mass storage device such as a hard disk drive can handle effectively in a given configuration. The present invention's "rich" data stream management techniques measure a data stream's throughput, further recognize that the throughput of each data stream may vary over time, as well as differ from other data streams, and strive to maintain the cache for each data stream as full as possible, based on individual and instantaneous throughput. To maintain each data stream's cache as full as possible, at least a minimum predefined amount of data is returned each time the data stream is serviced. More than this minimum will be retrieved if possible. These techniques permit this increased performance. Each data stream's cache is kept as full as possible based on its need for data over each successive unit of time. The data stream that is furthest from being "full" receives priority on support to fill it up. Management of system resources in terms of data stream throughput results in increasing the number of data streams that can be supported.

The present invention will now be described in detail with reference to the figures listed and described below.

DETAILED DESCRIPTION OF THE PREFERRED EMBODIMENT

Figure 1:
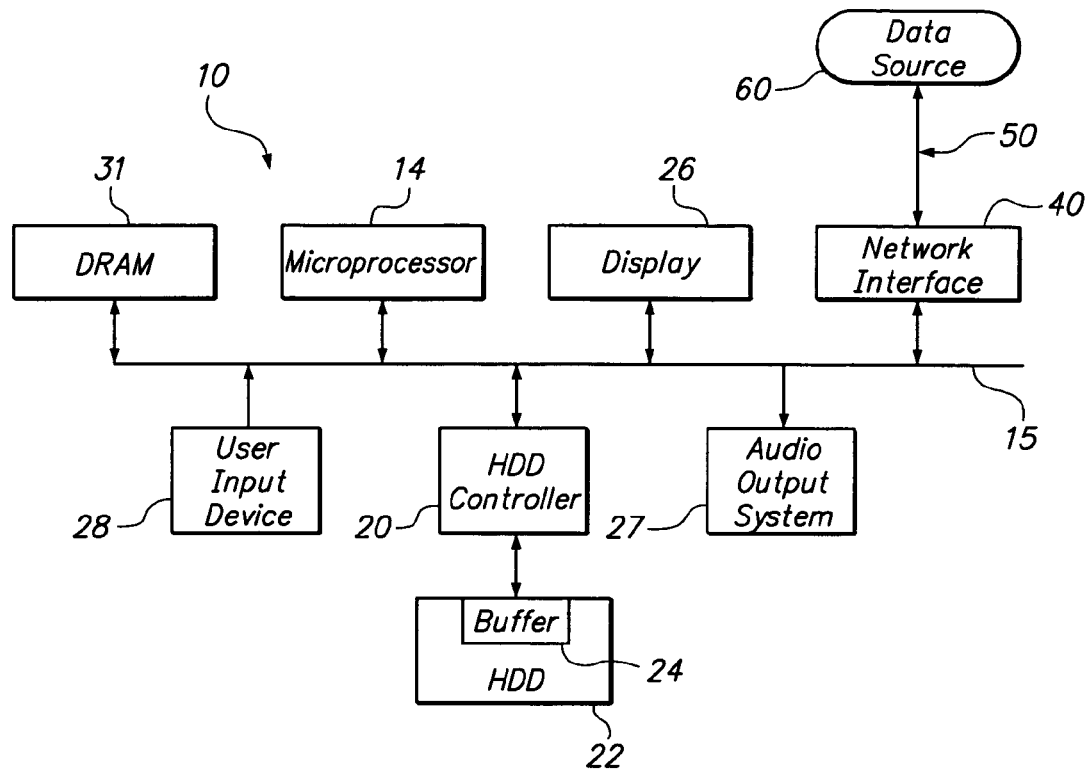
FIG. 1 is a block diagram of one embodiment of a system that incorporates the methods of the present invention.

One possible embodiment of a system incorporating the present invention is illustrated in FIG. 1. System 10, shown in FIG. 1, is comprised of bus 15, to which are coupled microprocessor 14, data display 26, user input device 28, audio output system 27, Dynamic Random Access Memory (DRAM) 31, network interface 40 and hard disk drive (HDD) controller 20. In turn, HDD controller 20 is coupled to HDD 22, which has internal read/write memory buffers 24. Typically, memory buffers 24 will be formed from a known semiconductor memory such as dynamic random access memory (DRAM). Memory buffer 24 temporarily stores data that is either being written or read from the HDD. With respect to the present invention, the construction of HDD 22 and memory buffers 24 is known in the art. Network interface 40 can be comprised of any known network connection system including a dial-up modem, Ethernet, etc. Through the network interface 40, system 10 can be coupled through to a network 50 such as an intranet or the Internet to any source of digital data 60. The exact source 60 is not of consequence to the present invention so long as it can store and transmit over network 50 any type of digital data including data streams. System 10 may represent a personal computer in at least one embodiment of the present invention.

Within system 10, data display 26 is also known and may comprise a CRT, LCD or a plasma display. The display technology used with the present invention is not of consequence to the present invention as long as that display technology can display a data stream. User input device 28 is also meant to generically represent any of the many user input control devices such as keyboards, trackballs and "mice" that can be used to provide user input to a computing system. The precise type of user input device is not central to the present invention. Similarly, audio output system 27 may comprise speakers, powered speakers, headphones or any similar type of audio output device. System 27 is herein intended to include audio output cards that accept digital signals as input and generate an analog output signal that is then amplified and played by system 27.

Although this description focuses on the case where data streams are read from a disk drive and then displayed or otherwise provided as output, the present invention also operates when data streams are written from a data source of any type to another storage medium. Thus, the methods and apparatus described herein operate equally well when a data stream is transferred from one storage device to another, as well as when the data stream is used as output from the system.

For purposes of the description of this first preferred embodiment, the present invention may be considered to reside within HDD controller 20. HDD controller 20 receives commands to store data from microprocessor 14, the data being generated by the user input device 28 or received from an external data source 60 either through the Internet or from another similar communications channel. Microprocessor 14 may also order HDD controller 20 to read data from HDD 22. In both cases of writing to and reading from HDD 22, HDD controller 20 controls the flow of data into and out of HDD 22, allocating memory buffers 24 as required and transmitting and receiving data over bus 12 as necessary and as instructed by microprocessor 14.

Although system 10 illustrates HDD controller 20 as separate from HDD 22, typically HDD controller 20 resides within the same housing as HDD 22. In this embodiment, the method of the present invention is programmed into HDD controller 20. It would be possible to program microprocessor 14 to perform the same tasks, in which case the need for a separate HDD controller might be eliminated. Similarly, the exact configuration of the other components illustrated in FIG. 1 in no way limits the present invention. The essential components of the present invention are one or more mass storage devices capable of storing large digital files that need to be treated as data streams, a controller for reading and storing digital data from and into those mass storage devices and a buffer memory coupled to the controller and the mass storage devices which operates at a faster speed than the mass storage device and temporarily stores data being moved to and from the mass storage device under instructions from the controller.

In other embodiments of the present invention, the present invention could reside within microprocessor 14. In that embodiment, DRAM 31 could serve as the buffer for the data streams. In yet another embodiment, the present invention could reside within a host computer coupled to a large digital data storage system and a plurality of personal computers could be coupled to the host computer through a network. In any of these alternative embodiments, the purpose and operation of the present invention is essentially the same: it determines whether requests comprise data streams and it manages a plurality of data streams at the same time.

This specification will describe the construction and operation of the present invention primarily in the context of reading data from a mass storage device. It should be understood that it functions equally well and with no substantial modifications writing data streams to the mass storage device.

The present invention detects data streams that present themselves in complex patterns as well as data streams that comprise a series of sequential commands only. The definition of a data stream herein allows for a fair amount of potential overlap or leeway between the sequential commands that form the data stream. A combination of physically sequential accesses (no matter how these sequential accesses actually present themselves temporaly) to data at a relatively constant data rate comprises a data stream in the present invention. The understanding that a data stream's throughput is the critical parameter to manage data streams properly distinguishes the present invention from prior attempts to improve data stream management.

The present invention, in its first embodiment, recognizes at least seven (7) different command patterns as comprising data streams. In other embodiments and in extensions of the present invention, other patterns may be recognized as comprising data streams. These seven patterns are therefore not intended to be exclusive or comprehensive.

Figure 2A:
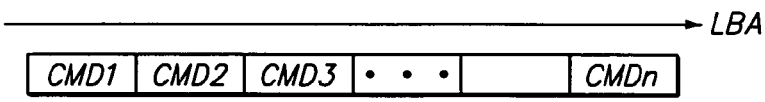
FIGS. 2a through 2g illustrate the forms data streams may take that the present invention recognizes.

The simplest form of a data stream is illustrated in FIG. 2a, where the commands are completely sequential, herein numbered as Cmd1 through CmdN. This type of data steam is typical of an application load in a clean and un-fragmented computer system with no external references. Each command requests the retrieval of the same amount of data. As certain operating systems have certain programs that have short sequential command streams of this type, an empirically derived number of sequential commands must be detected before the sequential commands can be designated as a data stream. In this embodiment of the present invention, thirteen sequential commands must be detected before designating the sequence a data stream. This number can be increased or decreased as appropriate for different operating environments and operating systems. This minimum number of sequential commands also has a throughput related requirement that the pre-stream has a certain minimum throughput. This minimum throughput is required as launching a new data stream entails significant computational and time overhead, particularly in the allocation of cache memory and in filling the cache with at least an amount of data determined by the pre-stream's throughput and the present invention's predetermined time interval for a data stream. For purposes of this invention, this predetermined time interval represents a set number of seconds of data for each data stream. Although this time in seconds does not change, the amount of data needed to fill the cache for that time period will vary from data stream to data stream.

Figure 2B:
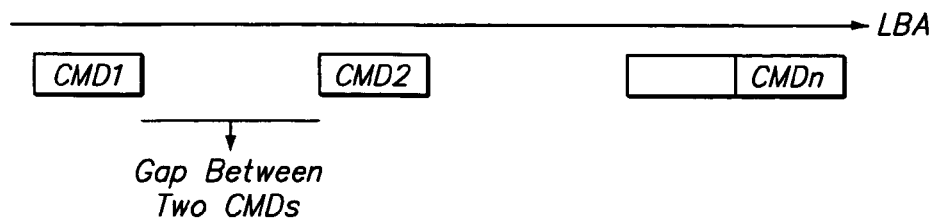

Detection of a data stream when successive commands in the data stream are not sequential and which are separated by other commands that are not part of the data stream is a more difficult problem. As illustrated in FIG. 2b, a gap can occur between any two commands in a potential data stream. The gap may be of any size or width up to a predetermined maximum width. In this first embodiment, if the distance between two commands exceeds 800 sectors, the commands on either side of the gap are assumed to not comprise a data stream. In other embodiments, this gap can be reset by the system operator. A longer permissible gap typically requires more system resources to support, particularly cache memory, as typically more pre-streams would require tracking. These large gaps between commands that form part of the data stream can occur in several situations, particularly when a "fast forward" command is given to a personal video recorder (PVR). These gaps can also be caused by occasional, non-sequential random access commands that occur unpredictably. The acceptable gap can be varied or adjusted based on empirically determined criteria.

Figure 2C:
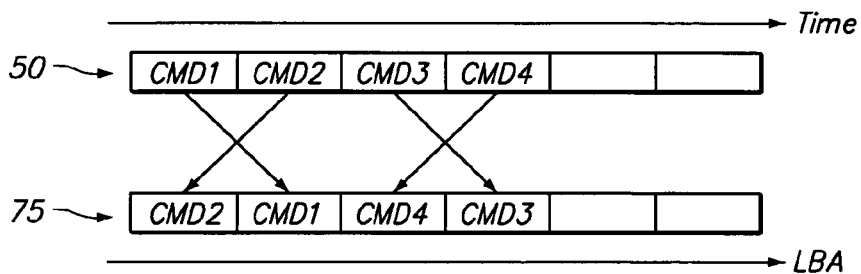

FIG. 2c illustrates a particular pattern that can occur when the Windows operating and file system is stressed beyond a certain point. The command sequence 50 is what would normally be expected for a data stream—a series of sequential commands. The actual observed data stream is shown as stream 75, wherein the sequential commands are received in a scrambled pattern. Successive elements in the data stream in time are not presented in successive, LBA order. The pattern of data stream 75 illustrated in FIG. 2c is relatively easy to decipher and detect. This pattern of crossover commands has been observed in regular Window accesses, where crossovers of up to four (4) commands and more have been observed. In the first embodiment of the present invention, a data stream that exhibits crossovers of up to eight (8) commands will be detected. In other embodiments, larger cross-overs can be accommodated as necessary. The "scrambled" data stream is recognized as a data stream and the commands are "unscrambled" to expedite reading the data from the storage devices, but the data is supplied to the host in exactly the order it was requested.

Figure 2D:
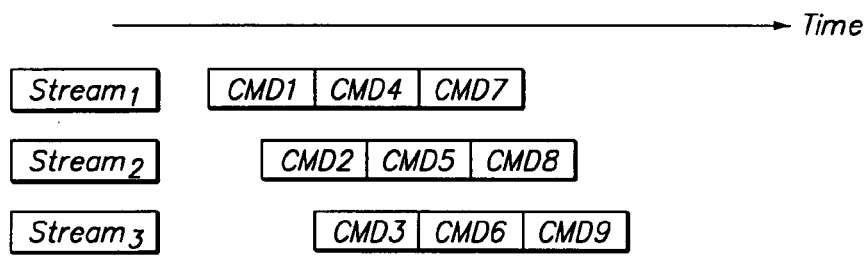

When multiple large files are being accessed nearly simultaneously, such as multiple DVDs or several large digital photographs, several data streams are generated that can require nearly simultaneous support. The command sequences may appear as illustrated in FIG. 2d. These data streams can be called interleaved data streams, with different Logical Block Address spaces (LBAs) on different parts of the disk drive. In this scenario, the operating system is attempting to service these data streams by sequentially retrieving the next command for each data stream. This approach unfortunately results in filling the buffer inefficiently for all of the multiple data streams. This particular problem has been previously described: by not considering throughput, earlier known attempts to deal with data streams ordered the reading of the same amount of data for each data stream. This requires frequent, large moves of the disk drive's transducers. This movement time is wasted as far as providing adequate data for each data stream is concerned. Ultimately, as none of the buffers for any of the data streams are adequately filled, more and more transducer movement is commanded to read data in an increasingly frantic attempt to prevent any one of the data streams from starving for data. This phenomenon is called herein "thrashing." Each of the multiple simultaneous data streams can have different throughput from the others. Additionally, each data stream's throughput may vary over time. The present invention tracks the needed throughput of the pre-streams, to determine if they qualify as data streams, tracks the throughput of recognized data streams so that their buffers can be kept properly full and finally tracks throughput to determine if a data stream has fallen below a minimum required throughput and must be terminated.

Figure 2E:
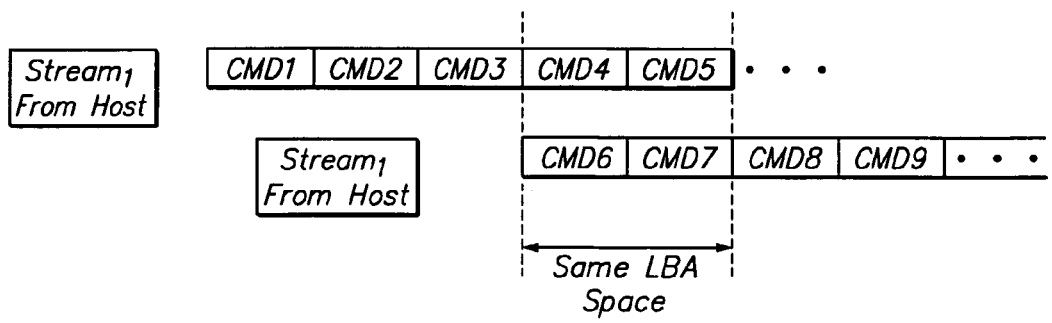

A single data stream can also appear as two overlapping data streams, as illustrated in FIG. 2e. After the data stream has begun, the same data stream is accessed again, but at a different point in the data stream. The same LBAs appear multiple times for the same data stream. This situation has been observed with audio data streams, where the throughputs of the data streams are identical, but their starting points and starting times are different. This pattern can also arise when the system user must make certain that no part of the data stream is lost. With this situation, it is important to define the maximum LBA space that may be shared by the data stream.

Figure 2F:
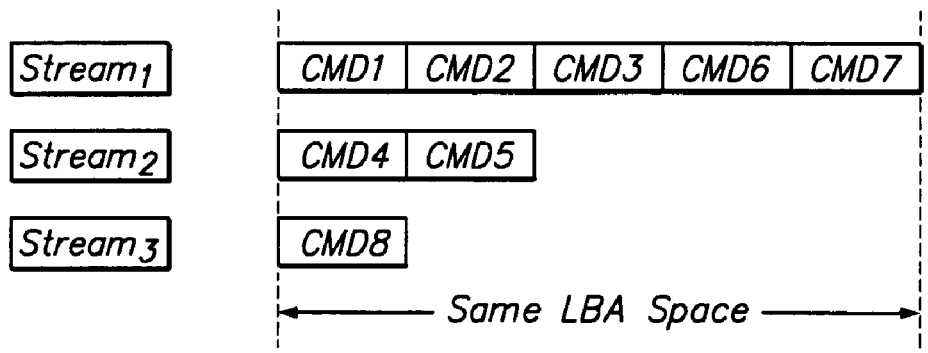

If the same file or LBA space is accessed by several different users at different times, the data stream pattern illustrated in FIG. 2f can result. One of the data streams is already established. Thereafter, another user begins viewing the same data at a different point. The throughput of each user may vary, despite viewing the same file. This pattern of data streams is seen most commonly in time-shifting environments, such as that enabled by personal video recorder (PVR) technology, the most well-know of which are TiVo and RePlay.

Figure 2G:
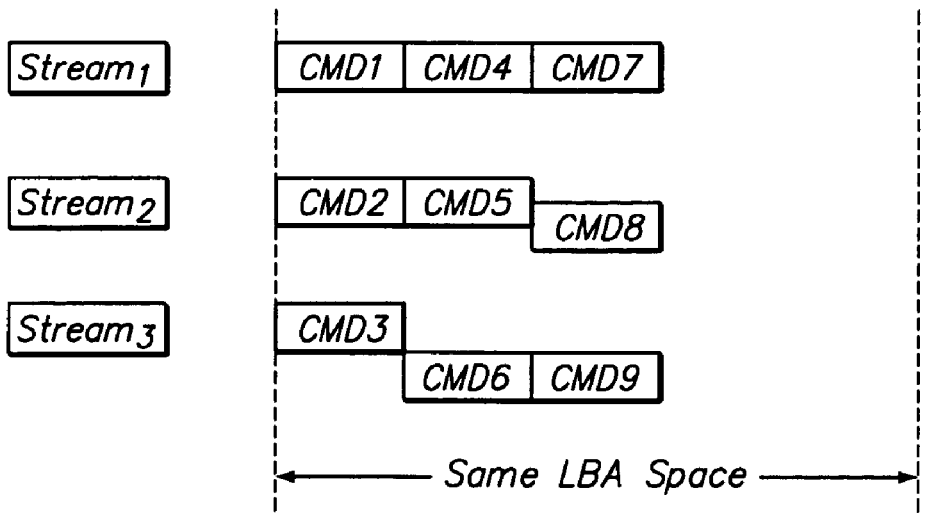

A variation of the data stream pattern shown in FIG. 2f is illustrated in FIG. 2g. In FIG. 2g, multiple data streams accessing the same file or LBA begin at the same time. This can occur when multiple copies of the same data stream are started at the same time, but each data stream is sent to a different destination. This case presents the difficult challenge of detecting all the data streams simultaneously, before their throughput requirements are known.

Certain audio/visual data streams exhibit an inherent variability in throughput, in particular when the data stream is compressed. MP3 audio data streams and MPEG video data streams share this characteristic. This variability can be relatively large at any given moment, but is much less over the long run. The throughput management approach of the present invention is thus just as powerful with respect to these variable streams as it is with respect to constant throughput data streams, especially as the "longer term" in this case is at most a few seconds and more typically about ½ second.

The stream detection system of the present invention maintains and continually updates three lists: a) a list of the currently active data streams; b) a list of the currently recognized pre-streams, which include data streams that cannot be launched due to a lack of system resources; and c) a list of recent random access commands issued to the disk drive. As new commands are received, the system checks each list to see how the new command relates to the contents of the list.

The length of this last list, the most recent random access commands, can be varied to adapt to a user-defined level of the complexity and power of the data stream recognition engine. The longer this list is, the more complex and inter-woven the data streams detectable by the present invention can be. The length of the list is determined by the expected throughput of the data streams detectable by this system. Practical constraints such as a finite memory size places an upper limit on the number of commands that can be considered and stored in the random access command list. It has been empirically determined that a data stream should be at least 15 to 20 commands in length before it is recognized as a data stream, particularly when the data stream recognition engine begins to recognize a data stream after about 10 commands of it have been analyzed. A longer random command list equates to a longer history, which allows for the detection of data streams with a lower command rate or more interleaved data streams. The best way to set the length of the random access list is that its length should be in proportion to the maximum length of time during which the detection of streaming data is desired, and not at a fixed number of commands.

Designating a series of commands as a new data stream and dedicating the necessary support to it is expensive in terms of system resources. This designation or launching requires filling a stream cache for the new data stream with enough data so that it will not "starve" in the period of time during which the system services other, already supported data streams. This initial filling is a system priority and delays all other actions in support of other data streams. When the present invention must service a mixed load of random data accesses and data streams, it must avoid treating short-lived series of commands which appear to be data streams and other, random accesses as data streams, to avoid incurring the system penalties attendant with launching a data stream. Empirical evidence in a Windows operating system environment indicates that efficient data stream detection should not be triggered until at least thirteen (13) consecutive accesses.

In making the decision to launch a new data stream, the system calculates how much data the new stream will require for a predetermined period of time (two seconds worth, in one embodiment), how much time will be needed to read and store that amount of data, how much data has been cached for other supported data streams and whether the data cached for other running data streams will be sufficient to compensate for the disruption caused by the launch of the new stream. If all these conditions can be met, the new data stream is launched. If the conditions are not met, the new stream is not launched, but it remains in a list of recognized data streams that will be launched as soon as sufficient resources are available.

When a new command arrives, it is compared with the three lists sequentially and in decreasing priority order.

First, the list of known running data streams is checked. If the new command is part of one of the running data streams, it is recognized as such and the particulars of the data stream are updated. These particulars include recalculating the data stream's throughput and re-determining if the cache for the data stream is at least full enough to support the data stream for the predetermined time interval. The data stream is assigned a monitor that indicates when the data stream will expire for want of new data in its buffer. The monitor is adjusted based on the newly re-calculated throughput of the particular data stream. A data streams' throughput can vary during the life of the data stream, particularly if the data stream is a compressed files such as MP3 or MPEG.

The second list comprises the various series of commands which may be data streams, but which have not yet fulfilled all the predetermined conditions necessary to be designated as a data stream. These pre-streams are sets of recent "random" commands that may eventually meet all the criteria of a data streams. These pre-streams may also constitute fully recognized which cannot be launched for want of system resources. If the new command, when combined with an existing pre-stream becomes a recognizable data stream, that pre-stream is placed in a separate sub-list of recognized data streams that have not been launched. These recognized data streams will be launched when system resources are available. In at least one embodiment of the present invention, these recognized data streams are ranked by any one of several criteria, including their throughput, and then launched according to their ranking when resources become available.

Finally, if the new command is not part of a supported data stream list or a part of a pre-stream list (or its sub-list), it is compared to the list of the past non-stream/non-pre-stream commands that arrived in the last predetermined time interval. The list includes the arrival times of the commands, with read and write commands maintained in separate lists. The system attempts to find/construct one of the recognized types of data streams from the new commands and the other commands stored in this list. If the new command and other stored commands in this list matches a template of at least one of the data stream forms, the system recognizes a new pre-stream and this is moved into the pre-stream list.

Once a data stream has been recognized, the system must launch the new data stream while simultaneously maintaining the other recognized data streams. Each data stream is characterized by its throughput and its current LBA space. Each data stream also has a certain amount of cache space dynamically allocated to it, the amount of the cache depending on each data stream's throughput. The stream management system decides which data stream among the various recognized data streams must have the next access to storage I/O and for how much data. This amount of data is a function of the throughput of the data stream and the amount of data, defined as the amount of time the cached data will support the data stream, that remains in the cache for that particular data stream and the minimum amount of data that will be transferred.

Several factors are considered when this allocation process occurs:
a) the status of the data stream (launching, recovering from near data exhaustion, flowing);
b) the number of supported data streams;
c) the size of the streaming data cache;
d) the amount of time available until a "low mark" is reached for each of the supported data streams; and
e) the amount of time to be cached until the maximum amount of time usable by the data stream is reached ("high mark").

These parameters depend in turn upon the throughput of the stream and how much I/O irregularity the system is designed to manage. A typical audio or video data stream may preferably have roughly ½ second to one second of cache available. The present invention, in its first embodiment, manages data streams by maintaining each data stream's cache space as nearly full as possible, aiming at all times to have at least a predefined time interval's worth of data cached for each data stream. Having more than this minimum predefined time interval's data is always desirable and the system attempts to keep each data stream's cache as full as possible. Using this approach, in this embodiment, each data stream would have about one second's worth of data in the cache at all times, if no other issues or problems arise.

Alternatively, the amount of buffering can be reduced to a level that depends on the total configuration of the data streams and how long the system would need to recover from expected disruptions. Such disruptions include drive recalibration, which typically takes up to 0.3 seconds. Given this type of disruption, a buffer capacity of about 0.5 seconds for a long-term data stream may be a good first approximation. As the system becomes increasingly loaded by supporting more data streams, the cache would probably need to be increased as recovering from a disruption from any cause might disrupt all the data streams and cause a chain reaction.

As a general rule, the data stream whose buffer is furthest from full in terms of its maximum cached time is the data stream given the next access to storage. The concept of throughput is critical here. A data stream with a nearly empty cache may still have more time available to it, depending upon how much data it requires per unit time than another data stream whose cache contains more data, but yet requires more data per unit time to support it. As has been discussed, caching too little data to support each data stream's throughput can too easily lead to a situation where the transducers spend more time moving to new locations than they do transferring data. By aiming to keep the cache as full as possible temporaly, the present invention minimizes this problem.

Further checks and requirements occur when certain low time marks are reached or about to be reached for each data stream or when a data stream is launched. Data streams that are being launched should not be interrupted as often as a data stream that has been flowing for some time. Also, in order to maximize overall system throughput, transfer operations should last at least a minimum amount of time, transferring at least a minimum amount of data. Transfer operations that result in more than the minimum amount of data being transferred are fully acceptable, as long as no supported data stream is provided with less than its required minimum. Failure to keep transfer operations to a minimum may result in thrashing, which has been previously described herein, where the support of a first data stream impinges upon the proper support of the next data stream and so forth, to a degree where data streams are dropped. This phenomenon in turn limits the number of concurrently serviceable streams. This limit corresponds to the sum of the data stream throughputs and the amounts of time needed to switch from supporting one data stream to the next data stream, plus some margin. The most important limitation on the number of data streams that can be supported concurrently is the overhead costs of launching a new data stream. Launching data streams is by far the most demanding operation in terms of data transfer bandwidth and system processing, so much so that it dominates all other factors in determining the number of data streams that can be supported concurrently.

The launching of new data streams is perhaps the most critical of all tasks in the present invention. Once the new data stream is recognized, a stream manager must determine whether the new data stream can be safely launched and supported by the system as it is currently configured. If it cannot be supported, the system manager must reject the new data stream and place it in a group of recognized data streams that will be started and supported once sufficient system resources are available. In the first embodiment of the present invention, the new data stream is accepted if enough cache space can be made available for it and if the caches for the other supported data streams have sufficient data to supply the other supported data streams for the period of time needed to fill up the cache with a certain minimum amount of data for the new data stream and for the system to resume caching data for the other supported data streams without risking starvation of any of the supported data streams. As there is a maximum data bandwidth into and out of a disk drive, a new data stream cannot be accepted if too much of that disk access bandwidth has been committed to supporting other data streams. If the data stream has been placed in the list of recognized data streams that cannot be launched immediately, in some embodiments of the present invention, this list will be ranked according to any one of several metrics, including throughput, and launched based on a priority list reflecting the ranking metrics.

In another embodiment, new data streams could automatically be accepted and launched; if simultaneously a sufficient number of "less important" data streams were terminated to allow for sufficient support for the new data stream. This could often lead to thrashing, when the system shifts from supporting one data stream to another and back without predictability. Consequently this approach is not preferred and has not been implemented in the preferred embodiments of the present invention. There are ways to adapt this method to make it more acceptable. The addition of an "anti-thrashing" rule that requires a dropped data stream to start from even further back in the evaluation process than "scratch" to qualify as a data stream again could improve the performance of this alternate embodiment. Similarly, the system could be designed to give preference to data streams having the largest throughput. This approach would possibly increase the efficiency with which the system uses all available throughput. The operation of the present invention would be nearly identical to the first preferred embodiment with the exception of this preference in choice of data stream.

Launching a new data stream or re-launching a data stream that has expired from data exhaustion must be done in a manner that maintains the stable operation of the system. The newly launched data stream must be provided with sufficient data initially so that its cache will maintain the stream until the system can again return and retrieve more data to re-supply its cache. At the same time, loading the cache for the new data stream must not starve any currently supported data stream for data. Operationally, the most difficult situation for system management occurs when several data streams start simultaneously, as they all compete for better access to the data in order to fill up their individual cache spaces. One way to mitigate this problem is to force simultaneously launched data streams to launch sequentially.

As data stream support is expensive in terms of system resources, it is important to terminate support of a data stream efficiently when that data stream has ended. By monitoring each supported data stream on an on-going basis, the system can determine when a data stream's throughput drops below a predefined minimum. Once that minimum is reached, the data stream is dropped. Depending on the throughput of a particular data stream, the system monitors each data stream to determine if a new command has been received within an amount of time calculated for each data stream based on its throughput. This tracking of the data stream over time effectively detects the end of fast paced streams, as well as slower data streams. Merely waiting for a certain number of commands to pass before closing a data stream is not adequate, as a burst of fast paced random activity can occur between two successive streaming data commands. If the data stream's throughput falls below the minimum, the data stream is removed from the list of supported current data streams and the cache space used to support the terminated data stream is returned to the pool of available cache space.

To review, at least four features of the present invention's approach to data stream management distinguish the present invention from previous methods and apparatus designed for data stream management. First, the cache management herein is designed to keep the cache for each data stream as full as possible, rather than focusing on preventing the same cache from going empty. Priority is given to the data stream whose cache is furthest from full, full being measured in terms of how much data stream time the cached data will support. Second, the overall approach to data stream management herein is based on throughput, rather than quantity of data. Data streams herein are characterized by their throughput, not simply their total size. The needed throughput of a data stream is used to convert time into physical cache size. Third, recognizing a data stream and launching it is a critical balancing act involving supplying the newly recognized stream with enough data so that it will not be "starved" while other data streams are being serviced but not starving other existing data streams at the same time. In the present invention, a data stream that has dropped below a critical level of cached data must also be re-supplied quickly before exhaustion of its data, but other supported data streams and their caches cannot be disregarded at the same time. Ultimately, it may be better to exhaust one data stream's cache and later re-launch the data stream, rather than "short change" all the data streams and cause thrashing. Fourth, the ends of data streams are recognized in a timely manner, as throughput tracking helps define the end of data stream much more accurately than tracking the instantaneous storage space used by a data stream. If the throughput of a data stream drops below a certain minimum, it is no longer treated as a data stream. The present invention realizes that a data stream's throughput can vary, and this variation is accommodated when the minimum is originally set.

Figure 3:
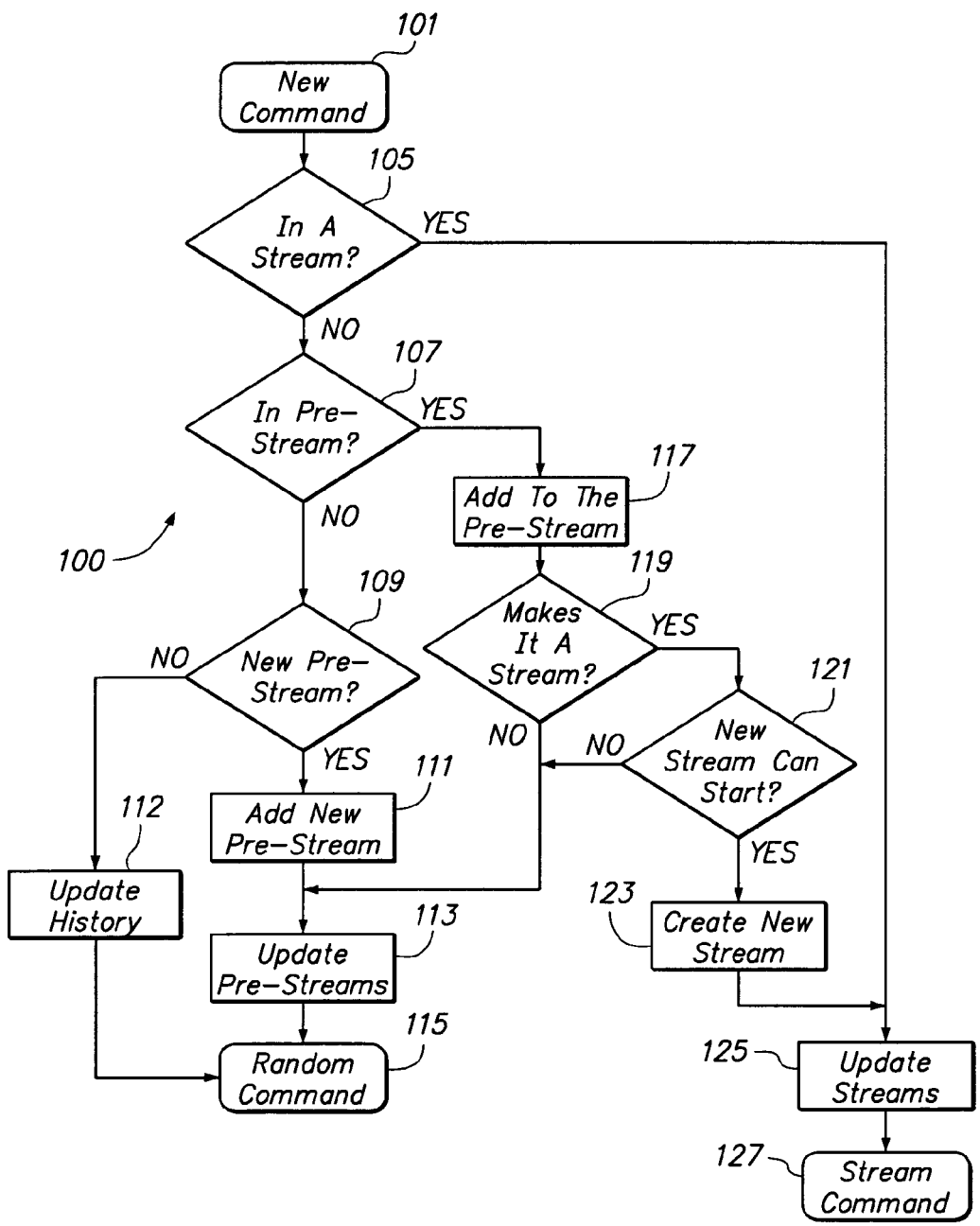
FIG. 3 is a flow chart showing how the present invention detects, supports and terminates support for data streams.

FIG. 3 is a flow chart illustrating the operation of the present invention, in its first embodiment. It tracks the preceding discussion of the operation of the present invention but in greater detail.

As shown in FIG. 3, stream detection process 100 is initiated at step 101 by the detection of a new command. At step 105, the command detected at step 101 is analyzed with respect to those data streams already being supported by the present invention. If the new command belongs to any of the data streams already being maintained, the list of supported streams is updated with information from the command detected at step 101 at step 125 and the command detected at step 101 is treated as a data stream command at step 127.

If the command detected at step 101 is not within an already supported data stream, the next query, at step 107, is whether the command is part of those pre-streams that have already been flagged as possibly being data streams. The present invention in its first embodiment keeps track of several sets of recent random commands that are potentially data streams or qualified as data streams, except that there are insufficient resources to support the launch of the pre-stream as a data stream.

If the command is determined to be part of an already established pre-stream (step 107), it is added to the pre-stream list at step 117. Then, at step 119, the system determines whether the addition of the command to the pre-stream at step 117 now makes the pre-stream a recognizable data stream (step 119). If the pre-stream now qualifies as a recognizable data stream, at step 121 the system determines whether there are sufficient resources to launch the recognizable data stream and, if so, removes the newly recognized data stream from the list of recognized pre-streams. In some embodiments of the present invention, the recognizable data stream is placed in another list of recognizable data streams that have not yet been launched, for whatever reason. If the data stream can be launched, it is launched at step 123, the list of supported data streams is updated at step 125 and the command is handled as a stream command at step 127.

If the command did not make the pre-stream a recognizable data stream (step 119) or if the newly recognized data stream cannot be launched, then, at step 113, the list of pre-streams is updated and, at step 115, the command is treated as a random command.

If at step 107 it is determined that the new command is not part of an existing, tracked pre-stream, then a query is made at step 109 as to whether the command, combined with earlier tracked but apparently random commands, should start a new pre-stream. If the command is to start a new pre-stream, at step 111 the command is used to form a new pre-stream, at step 113 the pre-stream list is updated but the command is still processed as a random command at step 115.

If the new command will not be treated as a new pre-stream (step 109), at step 112 the system updates the command history file and the command is processed as a random command at step 115. The command file history is culled based on time, with earlier commands which were received more than a predefined time ago removed. These older commands are stale and cannot form part of a data stream that requires support from the present invention.

The present invention reduces system cache needs by at least a factor of two when compared with a known round-robin cache support method when five data streams are supported. In a round-robin cache support system, each data stream is serviced in a fixed sequence. Simulations indicate that this method requires roughly ten times more cache space to support the same data streams without starvation, if indeed it can support the data streams without starvation. The excess transducer movement occasioned by this fixed pattern of service usually leads to thrashing among the data streams. Round-robin is ill suited to support data streams with widely different throughputs and works best when the data streaming makes little demand on the global throughput.

Another alternative data stream support method, starvation prevention, provides data to a data stream when the cache available to that data stream is nearly empty, or at least low enough to trigger system attention. Although this is a classical approach to caching, simulations indicate that the method is utterly unable to support multiple data streams, as it starves a data stream before allowing it to get new data, thus in turn starving the next data stream while providing data for the first data stream so it can recover. Eventually, thrashing between two or more competing starved data streams occurs.

It might be possible to determine the total amount of data in a data stream and then allocate cache based on this total cache need. As has been observed herein, if the throughput of the data stream is ignored, the allocation of cache based on total data will be both wasteful and unworkable. For a system with limited cache space, significantly more data streams can be handled with the present invention than in known systems. The improvement is a factor of at least two. The handling of these additional data streams is also much more resilient than in known systems and larger glitches in the data transfers can be tolerated.

The advantages of the present invention increase with the number of data streams and as the cumulative data stream throughput approaches the maximum system throughput. Various "hiccoughs" in data transfer among the data streams are also managed more effectively with the present invention. The present invention also reduces the number of disk drive seeks required to support the data streams, limiting the amount of noise produced by the disk drive.

What is claimed is:

1. A method for supporting data stream detection and processing in a computing system, the method comprising the steps of:
   detecting data streams in the data traffic between a mass storage device and a processor device;
   launching newly detected data streams by allocating memory storage for the detected data streams;
   managing memory storage to maintain at least a predefined time interval's worth of data in memory storage for each launched data stream; and
   releasing the memory storage for the launched data streams when the launched data streams terminate.

2. The method of claim 1 wherein the step of detecting data streams further comprises the steps of detecting if a new command forms part of a data stream that has already been launched.

3. The method of claim 2 wherein the step of detecting data streams further comprises the step of detecting if a new command relates to at least one of a plurality of potential data streams being tracked by the computing system.

4. The method of claim 3 wherein the step of detecting data streams further comprises the step of placing each new command that is not part of a data stream that has already been launched and which is not associated with any of the potential data streams being tracked by the computing system into a list of commands which list tracks commands that may form potential data streams.

5. The method of claim 1 wherein memory storage is allocated to launched data streams based on the amount of data needed to support the launched data stream for a predetermined amount of time.

6. The method of claim 1 wherein the step of launching newly detected data streams further comprise the steps of:
   determining if the system can support launching a newly detected data stream without interrupting support for already launched data streams; and
   launching the newly detected data stream by allocating memory storage to it and filling the memory storage with sufficient data for the newly launched data stream to support the newly launched data stream for enough time to resume managing memory storage for the already launched data streams, if the newly detected data stream can be launched without interrupting support for already launched data streams.

7. The method of claim 6 wherein the step of launching further comprises the step of storing newly detected data streams in a list of data streams which will be launched when resources are available, if the system has determined that it cannot launch the newly detected data stream without interrupting support for already launched data streams.

8. The method of claim 7 wherein the step of launching further comprises prioritizing the list of newly detected data streams that cannot be launched based on the throughput of each newly detected data stream.

9. The method of claim 1 wherein releasing the memory storage occurs when a launched data stream drops below a minimum predefined level of data throughput.

10. A system for detecting and processing data streams, the system comprising:
    a data stream detector;
    a data stream manager that determines whether a data stream detected by the data stream detector can be launched and allocates an amount of cache memory to each data stream it determines can be launched, the amount of cache memory determined by the throughput of the detected and launched data stream; and
    a data stream terminator.

11. The system of claim 10 wherein the data stream detector detects if a command for data comprises part of a data stream already launched and managed by the data stream manager.

12. The system of claim 11 wherein the data stream detector can detect if a command for data comprises part of a potential data stream already being tracked for recognition by the data stream detector.

13. The system of claim 12 wherein the data stream detector can detect if a command for data does not belong to either a data stream already launched and managed or a potential data stream already being tracked and is therefore a potential command of a new data stream that should be tracked.

14. The system of claim 10 wherein the allocated cache memory is continually readjusted based on the variable throughput of the launched data stream.

15. The system of claim 10 wherein the data stream detector can detect a data stream that exhibits one of seven predefined data stream patterns.

16. A data stream processing method comprising the steps of:
    detecting at least a first data stream in the data exchanged with a first mass storage device;

launching and supporting the at least first detected data stream, and further comprising determining the throughput of the at least first data stream and allocating cache memory to the at least first data stream based on the throughput so determined; and detecting that the at least first data stream has ended and terminating support to the at least first data stream.

17. The data stream processing method of claim 16 wherein the step of detecting at least a first data stream further comprises determining whether every new command for data belongs to the at least first data stream that has already been launched and supported.

18. The data stream processing method of claim 17 wherein the step of detecting at least a first data stream further comprises determining whether each new command for data comprises part of other data streams which have been detected, launched and supported.

19. The data stream processing method of claim 18 wherein the step of detecting at least a first data stream further comprises maintaining a list of a plurality of potential data streams, each new command for data being checked to determine if the new command, when combined with one of the plurality of potential data streams now comprises a data stream that should be launched and supported.

20. The data stream processing method of claim 19 wherein the step of detecting at least a first data stream further comprises the step of creating a new potential data stream candidate for the list of potential data streams and adding a new command for data to it, if the new command for data does not form part of an already detected data stream and does not belong to any one of the potential data streams already being tracked.

21. The data stream processing method of claim 16 wherein the allocated cache memory can be adjusted depending on variations in the throughput of the supported data streams.

22. In a data processing system having at least a first microprocessor for requesting and processing data streams, at least a first mass storage device for storing data streams, at least a first cache memory for temporarily storing data retrieved from the mass storage device before transmitting the retrieved data for processing, a data stream controller coupled to the at least first mass storage device, the at least first microprocessor and the at least first cache memory, the data stream controller comprising:
  a data stream detector for monitoring the data traffic to and from the at least first mass storage device and for detecting the presence of data streams in the data traffic; and
  cache memory controller for launching, supporting and terminating the data streams detected by the detector, wherein the cache memory controller allocates cache memory to each launched and supported data stream based on the data throughput of each data stream.

23. The data stream controller of claim 22, wherein the data stream detector detects whether every new command in the data traffic is associated with a data stream which the cache memory controller has already launched and is supporting.

24. The data stream controller of claim 23, wherein the data stream detector maintains lists of potential data streams and checks whether each new command in the data traffic is associated with one of the potential data streams already being tracked by the detector.

25. The data stream controller of claim 24, wherein the data stream detector creates a new entry in the list of potential data streams if the new command does not belong to either a launched and supported data stream or a potential data stream already being tracked in the list of potential data streams.

26. The data stream controller of claim 22, wherein the amount of cache memory allocated to a data stream can vary over time as the throughput of the data stream varies.

27. The data stream controller of claim 22 wherein the data stream detector can detect a data stream exhibiting at least one of at least seven predefined data stream patterns.

28. A system for detecting and processing data streams, the system comprising:
  a data stream detector;
  a data stream manager that does not launch a data stream detected by the data stream detector until the system can launch and support the newly detected data stream without affecting the support of previously launched and non-terminated data streams; and
  a data stream terminator.

29. The system of claim 28 wherein the data stream detector detects if a command for data comprises part of a data stream already launched and managed by the data stream manager.

30. The system of claim 29 wherein the data stream detector can detect if a command for data comprises part of a potential data stream already being tracked for recognition by the data stream detector.

31. The system of claim 30 wherein the data stream detector can detect if a command for data does not belong to either a data stream already launched and managed or a potential data stream already being tracked and is therefore a potential command of a new data stream that should be tracked.

32. The system of claim 28 wherein the data stream manager prioritizes all data streams that have been detected but which it determined could not be launched, the data stream with the highest priority being launched first after the data stream manager determines that another data stream can be launched.

33. The system of claim 28 wherein the data stream detector can detect a data stream that exhibits one of seven predefined data stream patterns.

34. A system for detecting and processing data streams, the system comprising:
  a data stream detector;
  a data stream manager; and
  a data stream terminator that determines the end of a data stream when a supported data stream's throughput drops below a predefined minimum throughput.

35. The system of claim 34 wherein the data stream detector detects if a command for data comprises part of a data stream already launched and managed by the data stream manager.

36. The system of claim 35 wherein the data stream detector can detect if a command for data comprises part of a potential data stream already being tracked for recognition by the data stream detector.

37. The system of claim 36 wherein the data stream detector can detect if a command for data does not belong to either a data stream already launched and managed or a potential data stream already being tracked and is therefore a potential command of a new data stream that should be tracked.

38. The system of claim 34 wherein the data stream detector can detect a data stream that exhibits one of seven predefined data stream patterns.

39. A data stream processing method comprising the steps of:
- detecting at least a first data stream in the data exchanged with a first mass storage device;
- launching and supporting the at least first detected data stream; and
- detecting that the at least first data stream has ended and terminating support to the at least first data stream;
- wherein the steps of detecting, launching and supporting further comprise the step of launching a newly detected data stream only if the newly detected data stream can be launched without affecting the support of earlier launched and supported data streams.

40. The data stream processing method of claim 39 wherein the step of detecting at least a first data stream further comprises determining whether every new command for data belongs to the at least first data stream that has already been launched and supported.

41. The data stream processing method of claim 40 wherein the step of detecting at least a first data stream further comprises determining whether each new command for data comprises part of other data streams which have been detected, launched and supported.

42. The data stream processing method of claim 41 wherein the step of detecting at least a first data stream further comprises maintaining a list of a plurality of potential data streams, each new command for data being checked to determine if the new command, when combined with one of the plurality of potential data streams now comprises a data stream that should be launched and supported.

43. The data stream processing method of claim 42 wherein the step of detecting at least a first data stream further comprises the step of creating a new potential data stream candidate for the list of potential data streams and adding a new command for data to it, if the new command for data does not form part of an already detected data stream and does not belong to any one of the potential data streams already being tracked.

44. The data stream processing method of claim 39 wherein a newly detected data stream and is stored in a list of newly detected data streams and held in that list until the data stream can be launched and supported without affecting the support of earlier launched and supported data streams.

45. A data stream processing method comprising the steps of:
- detecting at least a first data stream in the data exchanged with a first mass storage device;
- launching and supporting the at least first detected data stream; and
- detecting that the at least first data stream has ended and terminating support to the at least first data stream, and further comprising monitoring the at least first data stream for a period of time that is based on the throughput of the data stream, so that the terminating a data stream occurs on a variable time interval based on the throughput of each supported data stream.

46. The data stream processing method of claim 45 wherein the step of detecting at least a first data stream further comprises determining whether every new command for data belongs to the at least first data stream that has already been launched and supported.

47. The data stream processing method of claim 46 wherein the step of detecting at least a first data stream further comprises determining whether each new command for data comprises part of other data streams which have been detected, launched and supported.

48. The data stream processing method of claim 47 wherein the step of detecting at least a first data stream further comprises maintaining a list of a plurality of potential data streams, each new command for data being checked to determine if the new command, when combined with one of the plurality of potential data streams now comprises a data stream that should be launched and supported.

49. The data stream processing method of claim 48 wherein the step of detecting at least a first data stream further comprises the step of creating a new potential data stream candidate for the list of potential data streams and adding a new command for data to it, if the new command for data does not form part of an already detected data stream and does not belong to any one of the potential data streams already being tracked.

50. In a data processing system having at least a first microprocessor for requesting and processing data streams, at least a first mass storage device for storing data streams, at least a first cache memory for temporarily storing data retrieved from the mass storage device before transmitting the retrieved data for processing, a data stream controller coupled to the at least first mass storage device, the at least first microprocessor and the at least first cache memory, the data stream controller comprising:
- a data stream detector for monitoring the data traffic to and from the at least first mass storage device and for detecting the presence of data streams in the data traffic; and
- cache memory controller for launching, supporting and terminating the data streams detected by the detector, wherein the cache memory controller does not launch a newly detected data stream if the launch will impact earlier launched and supported data streams negatively.

51. The data stream controller of claim 50 wherein the data stream detector detects whether every new command in the data traffic is associated with a data stream which the cache memory controller has already launched and is supporting.

52. The data stream controller of claim 51 wherein the data stream detector maintains lists of potential data streams and checks whether each new command in the data traffic is associated with one of the potential data streams already being tracked by the detector.

53. The data stream controller of claim 52 wherein the data stream detector creates a new entry in the list of potential data streams if the new command does not belong to either a launched and supported data stream or a potential data stream already being tracked in the list of potential data streams.

54. The data stream controller of claim 50 wherein the cache memory controller generates a priority number for each newly detected data stream if the newly detected data stream cannot be launched immediately and wherein the cache memory controller launches and supports the newly detected data streams according to their priority number as it becomes possible to launch newly detected data streams without impacting earlier launched and supported data streams negatively.

55. The data stream controller of claim 50 wherein the data stream detector can detect a data stream exhibiting at least one of at least seven predefined data stream patterns.

56. In a data processing system having at least a first microprocessor for requesting and processing data streams, at least a first mass storage device for storing data streams, at least a first cache memory for temporarily storing data retrieved from the mass storage device before transmitting the retrieved data for processing, a data stream controller coupled to the at least first mass storage device, the at least first microprocessor and the at least first cache memory, the data stream controller comprising:

- a data stream detector for monitoring the data traffic to and from the at least first mass storage device and for detecting the presence of data streams in the data traffic; and
- cache memory controller for launching, supporting and terminating the data streams detected by the detector, wherein the cache memory controller continually checks to determine if each supported data stream's throughput has dropped below a predefined minimum, the cache memory controller terminating support to each data stream whose throughput falls below the predefined minimum.

57. The data stream controller of claim 56 wherein the data stream detector detects whether every new command in the data traffic is associated with a data stream which the cache memory controller has already launched and is supporting.

58. The data stream controller of claim 57 wherein the data stream detector maintains lists of potential data streams and checks whether each new command in the data traffic is associated with one of the potential data streams already being tracked by the detector.

59. The data stream controller of claim 58 wherein the data stream detector creates a new entry in the list of potential data streams if the new command does not belong to either a launched and supported data stream or a potential data stream already being tracked in the list of potential data streams.

60. The data stream controller of claim 56 wherein the data stream detector can detect a data stream exhibiting at least one of at least seven predefined data stream patterns.

61. The data stream controller of claim 56, wherein the cache memory controller provides support to each data stream by supplying each data stream with enough data to maintain that data stream at its established throughput for at least an additional predefined minimum period of time.

* * * * *